(12) United States Patent
Huang et al.

(10) Patent No.: US 10,280,736 B2
(45) Date of Patent: May 7, 2019

(54) LOGGING METHOD FOR LOCATING WATERED ZONE IN HORIZONTAL WELL WITH HIGH WATERCUT PROBLEM BY ISOTOPE LABELING

(71) Applicant: INSTITUTE OF NUCLEAR PHYSICS AND CHEMISTRY, CHINA ACADEMY OF ENGINEERING PHYSICS, Mianyang, Sichuan (CN)

(72) Inventors: Wen Huang, Sichuan (CN); Shuming Peng, Sichuan (CN); Xuejie Wang, Sichuan (CN); Dazhi Qian, Sichuan (CN); Shilei Zhu, Sichuan (CN); Bin Tang, Sichuan (CN); Rundong Li, Sichuan (CN); Zhihua Zhang, Sichuan (CN); Jun Xie, Sichuan (CN); Songbao Zhang, Sichuan (CN); Jian Yao, Sichuan (CN); Yang Zhang, Sichuan (CN); Fang He, Sichuan (CN); Yi Chen, Sichuan (CN); Xin Luo, Sichuan (CN); Yujie Zhu, Sichuan (CN); Hanming Liao, Tianjin (CN); Tianlu Ni, Tianjin (CN); Xijun Yang, Tianjin (CN); Yong Yang, Tianjin (CN); Shubin Guo, Tianjin (CN)

(73) Assignee: INSTITUTE OF NUCLEAR PHYSICS AND CHEMISTRY, CHINA ACADEMY OF ENGINEERING PHYSICS, Mianyang, Sichuan (CN)

(*) Notice: Subject to any disclaimer, the term of this patent is extended or adjusted under 35 U.S.C. 154(b) by 309 days.

(21) Appl. No.: 15/104,194

(22) PCT Filed: Nov. 24, 2014

(86) PCT No.: PCT/CN2014/091984
§ 371 (c)(1),
(2) Date: Jun. 13, 2016

(87) PCT Pub. No.: WO2015/085855
PCT Pub. Date: Jun. 18, 2015

(65) Prior Publication Data
US 2016/0312605 A1    Oct. 27, 2016

(30) Foreign Application Priority Data

Dec. 13, 2013   (CN) .......................... 2013 1 0675243

(51) Int. Cl.
*E21B 47/04*  (2012.01)
*E21B 47/10*  (2012.01)
(Continued)

(52) U.S. Cl.
CPC .......... *E21B 47/1015* (2013.01); *E21B 33/12* (2013.01); *E21B 41/00* (2013.01);
(Continued)

(58) Field of Classification Search
CPC .. E21B 47/1015; E21B 47/044; E21B 43/121; E21B 41/00; E21B 33/12; E21B 47/10
See application file for complete search history.

(56) References Cited

U.S. PATENT DOCUMENTS 2,433,718 A * 12/1947 Teplitz ..................... G01V 5/08
                                                    250/260
3,710,114 A *  1/1973 Vann .................... E21B 47/0005
                                                    250/260
(Continued)

FOREIGN PATENT DOCUMENTS

CN      86106244 A      3/1988
CN      1081491 A       2/1994
(Continued)

OTHER PUBLICATIONS

State Intellectual Property Office of the People's Republic of China, International Search Report in International Patent Application No. PCT/CN2014/091984 (dated Mar. 2, 2015).

*Primary Examiner* — Angela M DiTrani Leff
(74) *Attorney, Agent, or Firm* — Leydig, Voit & Mayer, Ltd.

(57) ABSTRACT

A logging device and method for locating a watered zone in a horizontal well with high watercut problem by isotope labeling is provided. The method successively includes the following operations: a. solidifying an isotope used in an isotope releasing device into a water-soluble carrier; b. connecting the isotope releasing device with a tubing and setting them to a horizontal segment of the well; c. dissolving the water-soluble carriers in the water at the bottom of
(Continued)

the well to release the isotope, wherein the releasing rate is proportional to the flow rate of the water; d. starting a lift-up pump and beginning a production logging; and e. continuously performing γ-ray energy-spectrum analysis on produced water on the ground, so as to locate the watered zone of the horizontal well by the detected species and characteristic content of the isotope, thereby reduces operation risk, saves platform occupying time and logging cost.

16 Claims, 1 Drawing Sheet

(51) Int. Cl.
*E21B 33/12* (2006.01)
*E21B 41/00* (2006.01)
*E21B 43/12* (2006.01)
*B01D 9/00* (2006.01)

(52) U.S. Cl.
CPC .......... *E21B 43/121* (2013.01); *E21B 47/044* (2013.01); *B01D 9/0004* (2013.01); *B01D 9/0018* (2013.01)

(56) References Cited

U.S. PATENT DOCUMENTS

| | | | |
|---|---|---|---|
| 3,940,612 A * | 2/1976 | Sparlin | G01V 5/08 250/260 |
| 4,166,216 A * | 8/1979 | Cubberly, Jr. | E21B 47/1015 250/260 |
| 4,659,925 A | 4/1987 | Burbridge et al. | |
| 9,212,540 B2 * | 12/2015 | Woiceshyn | E21B 47/1015 |
| 2009/0025470 A1 * | 1/2009 | Green | E21B 43/117 73/152.18 |

FOREIGN PATENT DOCUMENTS

| | | |
|---|---|---|
| CN | 1718997 A | 1/2006 |
| CN | 101384794 A | 3/2009 |
| CN | 102182442 A | 9/2011 |
| CN | 103643942 A | 3/2014 |
| GB | 2276030 A | 9/1994 |

* cited by examiner

LOGGING METHOD FOR LOCATING WATERED ZONE IN HORIZONTAL WELL WITH HIGH WATERCUT PROBLEM BY ISOTOPE LABELING

CROSS-REFERENCE TO RELATED APPLICATIONS

This patent application is the U.S. national phase of International Application No. PCT/CN2014/091984, filed on Nov. 24, 2014, which claims the benefit of Chinese Patent Application No. 201310675243.0, filed Dec. 13, 2013, the disclosures of which are incorporated herein by reference in their entireties for all purposes.

FIELD OF THE INVENTION

The invention pertains to the technical field of petroleum logging devices, and particularly relates to a logging method for locating a watered zone in a horizontal well with high watercut problem by isotope labeling.

BACKGROUND OF THE INVENTION

Accurate diagnosis of a watered zone (also referred to as water exploration test in the industry) is the base and key for water control and stabilizing oil production in a horizontal well with high watercut problem, and is also a long-standing problem in production and management of a horizontal well both at home and abroad. At the present stage, the diagnosis of a watered zone can only rely on a foreign wireline logging method by using "downhole tractor+holdup meter+multi-parameter instrument". However, through application it is found that this method has the disadvantages that the wireline cannot go down along a complex drilling trajectory, and cannot pass through a complex well bore in a horizontal well, the logging cost thereof is high, the method cannot be applied on a large scale, the application scope is not wide, and the like. In addition, due to great difficulty in the process of construction and high risk in the process of operation, a number of horizontal wells with high watercut problem, with the long-standing problems of water producing unresolved, have to work in poor conditions and are even shut down and abandoned, which leads to extremely serious economic loss.

SUMMARY OF THE INVENTION

In order to overcome the disadvantages of great difficulty in operation and high cost during the locating of a watered zone in a horizontal well with high watercut problem in the prior art, in a first aspect, the invention provides a logging method for locating a watered zone in a horizontal well with high watercut problem by isotope labeling.

The logging method for locating a watered zone in a horizontal well with high watercut problem by isotope labeling according to the first aspect of the invention includes the following steps successively:

a. solidifying an isotope used in an isotope releasing device into a water-soluble carrier;

b. connecting the isotope releasing device with a tubing and setting them to a horizontal segment of the well;

c. dissolving the water-soluble carrier in the water at the horizontal segment at the bottom of the well to release the isotope, wherein the releasing rate is proportional to the flow rate of the water;

d. after the isotope releasing device is set into the well, starting production for 6-12 hours to remove accumulated liquid in the well, and ceasing production after a carryover effect, pressuring in a christmas-tree casing to open the isotope releasing device at the bottom of the well, starting a lift-up pump and beginning a production logging; and e. continuously performing γ-ray energy-spectrum analysis on produced water on the ground, so as to locate the watered zone of the horizontal well with high watercut problem by the detected species and characteristic content of the isotope.

In step a, different species of isotopes are separately solidified in different water-soluble carriers, and the water-soluble carriers are separately installed in different isotope releasing devices.

In step b, each of the isotope releasing devices is separately located at an interlayer or the position of an external casing packer between pay zones of the horizontal segment, and before the isotope releasing device is opened, the water-soluble carrier is sealed in the isotope releasing device and is not in contact with the water.

In step c, the water-soluble carrier is dissolved to release isotope during flowing of the water.

In step d, the pressure for pressuring in the christmas-tree casing is preferably 5 MPa. After pressuring in the christmas-tree casing, the isotope releasing devices at the bottom of the well are preferably all opened simultaneously or successively.

In step e, the γ-ray energy-spectrum analysis of produced water is continuously performed, preferably on an output pipeline on the ground.

Since the logging is conducted by means of the flow characteristics of the oil well, the logging method of the invention can be applied not only in a horizontal well, but also in a vertical well. Thus, in a second aspect, the invention further provides a logging method for locating a watered zone in a vertical well with high watercut problem by isotope labeling, which is characterized in that the method includes the following steps:

a. solidifying separately different species of isotopes in different water-soluble carriers, and installing separately the different water-soluble in different isotope releasing devices;

b. connecting the isotope releasing devices with a tubing and setting them to a target logging zone of a vertical well, wherein each of the isotope releasing devices is separately located at an interlayer between pay zones, and before the isotope releasing device is opened, the water-soluble carrier is sealed in the isotope releasing device and is not in contact with the water;

c. dissolving the water-soluble carrier to release the isotope during flowing of the waters, wherein the releasing rate is proportional to the flow rate of the water;

d. after the isotope releasing device is set into the well, starting production for 6-12 hours to remove accumulated liquid in the well, and ceasing production after a carryover effect, pressuring in a christmas-tree casing (preferably with a pressure of 5 MPa) to open the all isotope releasing devices at the bottom of the well simultaneously or successively, starting a lift-up pump and beginning a production logging; and e. continuously performing γ-ray energy-spectrum analysis on the produced water from an output pipeline on the ground, so as to locate the watered zone of the vertical well with high watercut problem by the detected species and characteristic content of the isotope.

In the invention, the isotope is Ru, Sr, or Ta.

In the invention, the water-soluble carrier is NaCl.

In the invention, the isotope releasing device includes a connector, a flared collecting inlet, an inlet-water guide channel, a carrier installation groove, a chamber for releasing an isotope from a carrier, and an outlet-water guide channel, wherein the connection relationship thereof is that: two ends of the carrier installation groove are fixedly connected with the connector through screw threads, the annularly communicated inlet-water guide channel, chamber for releasing an isotope from a carrier and outlet-water guide channel are fixedly arranged successively outside of an annular cylinder that is composed of the connector and the carrier installation groove; and the flared collecting inlet is disposed at an entrance of the inlet-water guide channel. The connector, carrier installation groove, inlet-water guide channel, chamber for releasing an isotope from a carrier and outlet-water guide channel are disposed coaxially with each other. A water-soluble carrier with a solidified isotope is installed in the carrier installation groove.

In the invention, two ends of the carrier installation groove of the isotope releasing device are connected with the connector through screw threads, the water flow is collected by the flared collecting inlet, and flows through the inlet-water guide channel into the chamber to wash the water-soluble carrier, and a solution containing dissolved isotope is discharged into the horizontal segment on the outer side of the tubing through the outlet-water guide channel.

The method of the invention performs the logging by means of measuring the flowing characteristics of the water in the horizontal well with high watercut problem. In various cases such as "water produced from a single zone or multiple zones" of the horizontal well, at lower reaches of multiple pay zones, the isotope releasing devices are arranged through the tubing, and the produced water flows along a consistent direction of "annular space-the bottom of the well-tubing-ground surface", and then a γ-ray detector and a spectrometer (e.g., a high-purity-germanium γ-ray detector and a γ-ray spectrometer available from ORTEC) are adopted to detect the species and characteristic contents of the isotopes carried in the produced water on the ground, so as to capture the flowing characteristics of the water in the horizontal well with high watercut problem and locate the watered zone.

The isotopes (A), (B) and (C) are separately solidified in the water-soluble carriers. The isotopes (A), (B) and (C) are Ru, Sr and Ta, respectively.

The water-soluble carriers carrying the isotopes can be dissolved in the water to release the isotopes (A), (B) and (C) respectively, wherein the releasing rate is proportional to the flow rate of the water, and in wells with different well temperatures, the releasing rate of the isotopes (A), (B) and (C) are only related to the flow rate of the water, rather than the well temperatures; and since the isotopes in the water-soluble carrier is micro constituent, which have no impact on dissolution characteristics of NaCl, the dissolving and releasing rate of the water-soluble carrier represents the releasing rate of the isotope.

The water-soluble carrier with the solidified isotope is installed in the carrier installation groove of the isotope releasing device. When the isotope releasing device is set into the oil well, the two ends of the isotope releasing device are connected with the tubing, such that the isotope releasing device can be opened by pressure-holding.

By conveyed through the tubing, multiple isotope releasing devices are set into the horizontal well, each of which is separately arranged at the interlayer between pay zones.

A lift-up pump, a casing pressure valve, a packer, an isotope releasing device, and a ball seat for horizontal well are connected through a tubing to assemble a logging device. The tail end of the logging device is set at the bottom of the well, and during the logging, the produced water of the oil reservoir is enabled to flow along a consistent direction of "annular space outside the tubing-the bottom of the well-tubing-ground surface".

In the invention, a method for solidifying the isotope in the water-soluble carrier includes the following operations: adding the isotope into NaCl to obtain a mixture, then dissolving completely the mixture in the water; crystallizing to form a mixed crystal material; and compacting the mixed crystal material into a certain shape. The adding amount of the isotope is preferably 0.5-5 g isotope per kilogram of NaCl (further preferably 0.8-3 g isotope per kilogram of NaCl, more preferably 0.8-2 g isotope per kilogram of NaCl, further preferably 0.8-1.5 g isotope per kilogram of NaCl, and for example 1 g, 1.2 g, 1.5 g or 1.8 g isotope per kilogram of NaCl). The crystallizing manner may be a manner well known in the prior art, such as evaporation crystallization, cooling crystallization, recrystallization, sublimation crystallization. The compacting is preferably performed on the mixed crystal material using a hydraulic pressure of 200 tons in an environment of high temperature greater than 500° C.

In a third aspect, the invention provides an isotope releasing device, including a connector (10), a flared collecting inlet (11), an inlet-water guide channel (12), a carrier installation groove (13), a chamber for releasing an isotope from a carrier (14) and an outlet-water guide channel (15), wherein the connection relationship thereof is that: two ends of the carrier installation groove (13) are fixedly connected with the connector (10) through screw threads (16) respectively; the annularly communicated inlet-water guide channel (12), chamber for releasing an isotope from a carrier (14) and outlet-water guide channel (15) are fixedly arranged successively outside of an annular cylinder that is composed of the connector (10) and the carrier installation groove (13); and the flared collecting inlet (11) is disposed at an entrance of the inlet-water guide channel (12); and the connector (10), carrier installation groove (13), inlet-water guide channel (12), chamber for releasing an isotope from a carrier (14) and outlet-water guide channel (15) are disposed coaxially with each other.

For the isotope releasing device according to the third aspect of the invention, a water-soluble carrier with a solidified isotope is installed in the carrier release chamber for releasing an isotope from a carrier (14).

For the isotope releasing device according to the third aspect of the invention, the isotope is Ru, Sr, or Ta.

For the isotope releasing device according to the third aspect of the invention, the water-soluble carrier is NaCl.

In a fourth aspect, the invention provides a method for solidifying a isotope in a water-soluble carrier, including the following operations: adding the isotope into NaCl to obtain a mixture, then dissolving completely the mixture in the water; crystallizing to form a mixed crystal material; and compacting the mixed crystal material into a certain shape. The adding amount of the isotope is preferably 0.5-5 g isotope per kilogram of NaCl (further preferably 0.8-3 g isotope per kilogram of NaCl, more preferably 0.8-2 g isotope per kilogram of NaCl, further preferably 0.8-1.5 g isotope per kilogram of NaCl, and for example 1 g, 1.2 g, 1.5 g or 1.8 g isotope per kilogram of NaCl). The crystallizing manner may be a manner well known in the prior art, such as evaporation crystallization, cooling crystallization, recrystallization, sublimation crystallization. The compacting is preferably performed on the mixed crystal material using a hydraulic pressure of 200 tons in an environment of high temperature greater than 500° C.

In a specific embodiment of the invention, the method for solidifying the isotope in the water-soluble carrier includes: adding 1 g isotope in 1 kg NaCl to obtain a mixture, dissolving the mixture completely in water, evaporative crystallizing to form a mixed crystal material, and then compacting the mixed crystal material into a certain shape by using a hydraulic pressure of 200 tons in an environment of high temperature greater than 500° C.

In a five aspect, the invention provides a water-soluble carrier with a solidified isotope, prepared by the method according to the fourth aspect of the invention.

The beneficial effects of the present invention are as follows:

1. In the invention, the isotope releasing device is installed on the tubing, it can be conveyed and pushed through the rigid tubing, and a lifting force not greater than 60 tons can be applied. Therefore a most difficult problem how the instrument is set into the horizontal well during logging is resolved, which is not limited by various borehole trajectories, the length of the horizontal segment and the wellbore conditions. Thus, the logging method for locating a watered zone in a horizontal well with high watercut problem by isotope labeling of the invention can overcome various restrictions of borehole trajectories and wellbore conditions, and reduce the risk in the process of operation. Meanwhile, the accident is easily handled if blocking occurs in logging.

2. In the invention, the means such as solidly packaging the isotope into the carrier, releasing the isotope from the carrier along with the flow of the water, and the like, are adopted, thus the logging method of the invention does not need power supply and signal uploading through wireline, thereby the location of a watered zone in a horizontal well or a vertical well can be achieved wirelessly in the absence of a wireline.

3. In the invention, γ-ray spectrum analysis is adopted to analyze the species and characteristic contents of the isotopes in the produced water, as compared with a conventional chemical detection method, the logging method has the characteristics that the detection can be performed continuously, and not need manual sampling, the accuracy of detection is high.

4. As compared with a wireline logging method, the logging method of the invention can be accomplished during pump checking operation of a horizontal well, not need to separately arrange logging equipment and logging time, thereby can reduce the platform occupied time during the logging of an offshore oil field, reduce more than one time of tripping operation, and save the preparing time for water control means, and also save the logging cost.

5. As compared with a mechanical logging method, the logging method of the invention does not need the coordination of a packer, a bridge plug, a downhole switch or the other tools by means of measuring the flow characteristic of the oil well, thereby can simplify the operation procedure, reduce the platform occupied time and operation risks during the logging of an offshore oil field, reduce more than one time of tripping operation, save the preparing time for water control means, and also save the logging cost.

6. As compared with a wireline logging method, in the invention, the isotope releasing device can be connected to various lift-up equipment for oil production in an oilfield, and the logging method can be applied in a production logging with a pump in a non-blowout horizontal well without the need of liquid nitrogen lift-up equipment.

7. Since the logging is conducted by means of measuring the flow characteristic of the oil well, the logging method of the invention can be applied not only in a horizontal well, but also in a vertical well.

REFERENCE SIGNS 1. lift-up pump, 2. casing pressure valve, 3. packer, 4. isotope releasing device, 5. water-soluble carrier A, 6. water-soluble carrier B, 7. water-soluble carrier C, 8. Ball seat for horizontal well, 9. tubing, 10. connector, 11. flared collecting inlet, 12. inlet-water guide channel, 13. carrier installation groove, 14. chamber for releasing an isotope from a carrier, and 15. outlet-water guide channel.

DETAILED DESCRIPTION OF THE EMBODIMENTS

The invention is described in detail in conjunction with the accompanying drawings.

Embodiment 1

Figure 1:
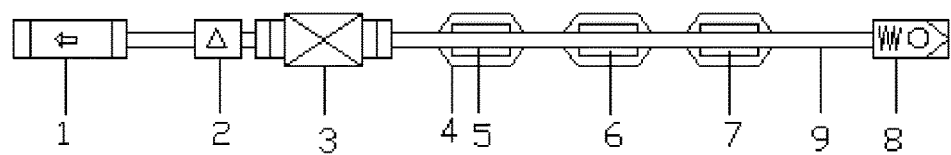
FIG. 1 is a schematic connection view of downhole devices used in a logging method for locating a watered zone in a horizontal well with high watercut problem by isotope labeling of the invention.
Figure 2:
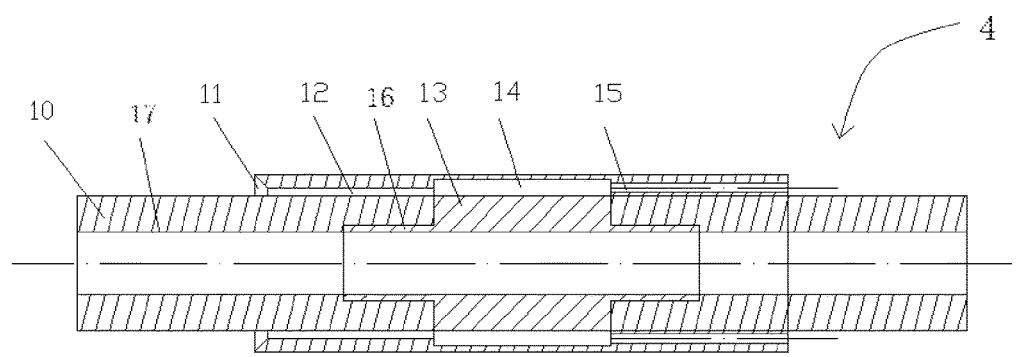
FIG. 2 is a schematic structure view of an isotope releasing device of the invention.

FIG. 1 is a schematic connection view of downhole devices used in a logging method of locating a watered zone in a horizontal well with high watercut problem by isotope labeling of the invention, and FIG. 2 is a schematic structure view of an isotope releasing device of the invention. In FIGS. 1 and 2, the logging process of the invention is illustrated in combination with a logging example. However, it should be noted by those skilled in the art that the invention is not limited to the specific implementations set forth herein, and any embodiment complying with the spirit of the invention should fall within the protection scope of the invention.

In this embodiment, the method for solidifying the isotope in the water-soluble carrier is: adding 1 g isotope in 1 kg NaCl to obtain a mixture, dissolving the mixture completely in water, evaporative crystallizing to form a mixed crystal material, and then compacting the mixed crystal material into a certain shape by using a hydraulic pressure of 200 tons in an environment of high temperature greater than 500° C.

The logging process of the invention includes three phases: assembly of logging devices, conveying and setting through a tubing, and production logging.

Assembly of logging devices: a water-soluble carrier A5 containing an isotope A, a water-soluble carrier B6 containing an isotope B, and a water-soluble carrier C7 containing an isotope C are respectively installed into isotope releasing devices.

Conveying and setting through the tubing: according to the sequence of setting into the well, an tubing 9 is successively connected to a ball seat 8 for horizontal well, an isotope releasing device 4, a packer 3, a casing pressure valve 2, and a lift-up pump 1, and they are conveyed and set into the well through the tubing 9, as shown in FIG. 1.

Production logging: the packers 3 is set in the straight segment of the horizontal well, and the lift-up pump 1 is used to pump for 6-12 hours to remove accumulated liquid in the well and the pump is stopped after a carryover effect. The isotope releasing device 4 is opened by pressuring in a christmas-tree casing, and the lift-up pump 1 starts operation, and the produced water out of wellhead enters a station after a γ-ray energy-spectrum analysis. The watered zone is diagnosed according to the detected species and characteristic contents of the isotopes in combination with the geological data of the horizontal well.

The isotope releasing device of this embodiment includes a connector 10, a flared collecting inlet 11, an inlet-water guide channel 12, a carrier installation groove 13, a chamber for releasing an isotope from a carrier 14 and an outlet-water guide channel 15, wherein the connection relationship thereof is that: two ends of the carrier installation groove 13 are fixedly connected with the connector 10 through screw threads 16 respectively; the annularly communicated inlet-water guide channel 12, chamber for releasing an isotope from a carrier 14 and outlet-water guide channel 15 are fixedly arranged successively outside of an annular cylinder 17 that is composed of the connector 10 and the carrier installation groove 13; and the flared collecting inlet 11 is disposed at an entrance of the inlet-water guide channel 12; and the connector 10, carrier installation groove 13, inlet-water guide channel 12, chamber for releasing an isotope from a carrier 14 and outlet-water guide channel 15 are disposed coaxially with each other. The water flow is collected by the flared collecting inlet, and flows through the inlet-water guide channel into the chamber to wash the carrier; and a solution containing dissolved isotope is discharged into the horizontal segment on the outer side of the tubing through the outlet-water guide.

In this embodiment, there are totally three isotope releasing devices with the same structure, and one of them is the isotope releasing device 4. The water-soluble carrier A5 containing the isotope A, the water-soluble carrier B6 containing the isotope B, and the water-soluble carrier C7 containing the isotope C are respectively installed in the three isotope releasing devices, and the isotopes A, B and C in the aforementioned three water-soluble carriers are respectively Ru, Sr, and Ta.

The logging principle of this method is illustrated in combination with an example in which water is produced in a single pay zone of the horizontal well with high watercut problem.

The water production problem of the horizontal well with high watercut problem is that: after the oil reservoir is opened by horizontal drilling, under the influence of natural factors and artificial factors, the water body in the oil reservoir break through a certain pay zone of the horizontal segment. Therefore a strong interference to other pay zones occurs, such that the water cut of the horizontal well becomes high and the crude oil output is sharply reduced. That is, a local pay zone of the horizontal segment produces a large amount of water, while other pay zones produce no or little water.

By using the method of the invention, multiple isotope releasing devices are arranged lower reaches of multiple pay zones, and thus the flow characteristics of such a horizontal well with high watercut problem can be analyzed based on the species and characteristic contents of the isotopes contained in the produced water.

A case in which water is produced at the toe end while the heel end and the middle have no water production is taken as an example. Three isotope releasing devices 4 are arranged respectively lower reaches of three pay zones (i.e. the heel end, middle and toe end) of the horizontal segment. Since the heel end and the middle portion have no water production, the isotopes A and B dissolved and released at the heel end and the middle cannot be carried to the ground surface due to the absence of flowing. By means of γ-ray detection, the isotope C and the characteristic content thereof can be detected, while neither isotope A nor B is detected, and thus the watered zone can be diagnosed according to the detected results in comparison with geological data.

In a case where water is produced at the middle while the heel end and the toe end have no water production, the isotope A dissolved and released at the heel end cannot be carried to the ground surface due to the absence of flowing. During the flow process of the water produced at the middle along the direction of "annular space outside the tubing-the bottom of the well-tubing-ground surface", it will carry not only the isotope B dissolved and released at the middle, but also the isotope C dissolved and released at the toe end. The releasing rate in the carrier is proportional to the flow rate, and the produced water flows from the middle towards the toe end with the same flow rate. Therefore by means of γ-ray detection at the ground surface, the isotopes B and C and the approximately same characteristic contents thereof can be detected, while no isotope A can be detected, and thus the watered zone can be diagnosed according to the detected results in comparison with geological data.

In a case where the water is produced at the heel end while the middle and the toe end have no water production, during the flow of the water produced at the heel end along the direction of "annular space outside the tubing-the bottom of the well-tubing-ground surface", it will carry not only the isotope A dissolved and released at the heel end, but also the isotopes B and C dissolved and released at the middle and the toe end. Since the releasing rate in the carrier is proportional to the flow rate and the produced water flows with the same flow rate along the direction "heel end-middle-toe end", by means of γ-ray detection, the isotopes A, B, C and the approximately same characteristic contents thereof can be detected, and thus the watered zone can be diagnosed according to the detected results in comparison with geological data.

The logging principle of this method is further illustrated in combination with an example in which water is produced in multiple pay zones of the horizontal well with high watercut problem.

In a case where the water is produced at the middle and the toe end while the heel end has no water production, during the flow of the water produced at the middle and the toe end along the direction of "annular space outside the tubing-the bottom of the well-tubing-ground surface", the sum of the amount of the water produced at the middle and the toe end per unit time will make the flow rate at the toe end greater than that at the middle, and by means of γ-ray detection at the ground surface, isotopes B and C and the difference between characteristic contents thereof can be detected, wherein the characteristic content of the isotope C can be greater than that of the isotope B. Thus, the watered zone can be diagnosed according to the detected results in comparison with the geological data.

The horizontal well with high watercut problem mentioned in this embodiment is an oil well which has a daily fluid output with a water content greater than 85%.

For the connection between downhole devices in the logging method for locating a watered zone in a horizontal well with high watercut problem by isotope labeling as described in the specification, the number of isotope releasing devices at the bottom of the well can be determined according to the number of pay zones of the horizontal segment at the bottom of the well, and different isotopes can be placed in respective water-soluble carriers.

Since the logging is conducted by means of the flow characteristics of the oil well, the logging method for locating a watered zone in a horizontal well with high watercut problem by isotope labeling as described in the specification can be applied not only in a horizontal well, but also in a vertical well. According to the disclosure of this specification, those skilled in the art can conduct the logging method for locating a watered zone in a vertical well by isotope labeling just by connecting the isotope releasing device with the tubing, and then setting them into a target test zone of the vertical well.

The invention claimed is:

1. A logging method for locating a watered zone in a horizontal well by isotope labeling, comprising the following operations:
   a. solidifying an isotope used in an isotope releasing device in a water-soluble carrier;
   b. connecting the isotope releasing device to a tubing and setting them in a horizontal segment of the well;
   c. dissolving the water-soluble carrier in water at a bottom of the well to release the isotope, wherein an isotope release rate is proportional to a flow rate of the water;
   d. after the isotope releasing device is set in the bottom of the well, implementing the following:
      starting production, to remove accumulated liquid in the well,
      after the accumulated liquid is removed and after a carryover effect is over, ceasing the production,
      pressurizing a christmas-tree casing to open the isotope releasing device at the bottom of the well, and
      starting a lift-up pump and beginning a production log; and
   e. continuously performing γ-ray energy-spectrum analysis on produced water above ground, so as to locate the watered zone of the horizontal well by characteristic content of the isotope in the produced water.

2. The logging method for locating a watered zone in a horizontal well by isotope labeling of claim 1, wherein in operation a, different species of isotopes are separately solidified in different water-soluble carriers, and the water-soluble carriers are separately installed in different isotope releasing devices.

3. The logging method for locating a watered zone in a horizontal well by isotope labeling of claim 1, wherein in operation b, each of the isotope releasing devices is separately located at an interlayer or a position of an external casing packer between respective pay zones of the horizontal segment, and before the isotope releasing device is opened, the water-soluble carrier is sealed in the isotope releasing device and is not in contact with the water.

4. The logging method for locating a watered zone in a horizontal well by isotope labeling of claim 1, wherein in operation d, the pressure for pressurizing in the christmas-tree casing is 5 MPa.

5. The logging method for locating a watered zones in a horizontal well by isotope labeling of claim 1, wherein in operation d, the isotope releasing devices at the bottom of the well are all opened simultaneously or successively.

6. The logging method for locating a watered zone in a horizontal well by isotope labeling of claim 1, wherein the isotope is Ru, Sr, or Ta.

7. The logging method for locating a watered zone in a horizontal well by isotope labeling of claim 1, wherein the water-soluble carrier is NaCl.

8. The logging method for locating a watered zone in a horizontal well by isotope labeling of claim 1, wherein the isotope releasing device comprises a connector, a flared collecting inlet, an inlet-water guide channel, a carrier installation groove, a chamber for releasing an isotope from a carrier and an outlet-water guide channel, wherein a connection relationship thereof is that: two ends of the carrier installation groove are fixedly connected with the connector through screw threads respectively; the annularly communicated inlet-water guide channel, chamber for releasing an isotope from a carrier and outlet-water guide channel are fixedly arranged successively outside of an annular cylinder that is composed of the connector and the carrier installation groove; and the flared collecting inlet is disposed at an entrance of the inlet-water guide channel; and the connector, carrier installation groove, inlet-water guide channel, chamber for releasing an isotope from a carrier and outlet-water guide channel are disposed coaxially with each other.

9. The logging method for locating a watered zone in a horizontal well by isotope labeling of claim 1, wherein a water-soluble carrier with a solidified isotope is installed in the carrier installation groove, and a dissolving and releasing rate is proportional to the flow rate of the water.

10. The logging method for locating a watered zone in a horizontal well by isotope labeling of claim 1, wherein a method for solidifying the isotope in the water-soluble carrier comprises the following operations: adding the isotope into NaCl to obtain a mixture, then dissolving completely the mixture in the water to obtain a mixed material; crystallizing the mixed material to form a mixed crystallized material; and compacting and forming the mixed crystallized material.

11. The logging method for locating a watered zone in a horizontal well by isotope labeling of claim 10, wherein the adding amount of the isotope is 0.5-5 g isotope per kilogram of NaCl.

12. The logging method for locating a watered zone in a horizontal well by isotope labeling of claim 10, wherein the crystallization manner is selected from a group consisting of evaporation crystallization, cooling crystallization, recrystallization and sublimation crystallization.

13. The logging method for locating a watered zone in a horizontal well by isotope labeling of claim 10, wherein the compacting and forming is performed on the mixed crystallized material using a hydraulic pressure of 200 tons in an environment of a temperature greater than 500° C.

14. The logging method for locating a watered zone in a horizontal well by isotope labeling of claim 1, wherein in operation d, the production is carried out for 6-12 hours.

15. A logging method for locating a watered zone in a vertical well by isotope labeling, comprising the following operations:
   a. solidifying separately different species of isotopes in different water-soluble carriers, and installing separately the different water-soluble carriers in different isotope releasing devices;
   b. connecting the isotope releasing devices to a tubing and setting them in a well, wherein each of the isotope releasing devices is separately located at an interlayer between pay zones of the well, a tail end of the logging tubing is set at a bottom of the well, and before the isotope releasing device is opened, the water-soluble carrier is sealed in the isotope releasing device and is not in contact with water;

c. dissolving the water-soluble carrier to release the isotope during flowing of the water, wherein a release rate is proportional to a flow rate of the water;

d. after the isotope releasing device is set in the well, starting a production to remove accumulated liquid in the well, and ceasing the production after the accumulated liquid is removed and after a carryover effect is over, pressurizing a christmas-tree casing to open any isotope releasing device at the bottom of the well simultaneously or successively, starting a lift-up pump and beginning a production log; and e. continuously performing γ-ray energy-spectrum analysis on produced water above an output pipeline on ground, so as to locate the watered zone of the vertical well by characteristic content of the isotope in the produced water.

16. The logging method for locating a watered zone in a vertical well by isotope labeling of claim 15, wherein in operation d, the production is carried out for 6-12 hours.

* * * * *